(12) United States Patent
Nakajima et al.

(10) Patent No.: US 10,423,107 B2
(45) Date of Patent: Sep. 24, 2019

(54) POLYIMIDE TUBE FOR FIXING BELTS

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Shingo Nakajima, Osaka (JP); Jun Sugawara, Osaka (JP); Masatoshi Ishikawa, Osaka (JP); Yoshitaka Ikeda, Osaka (JP); Kazuhiro Kizawa, Osaka (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 241 days.

(21) Appl. No.: 15/021,016

(22) PCT Filed: Jul. 7, 2015

(86) PCT No.: PCT/JP2015/069474
§ 371 (c)(1),
(2) Date: Mar. 10, 2016

(87) PCT Pub. No.: WO2016/013391
PCT Pub. Date: Jan. 28, 2016

(65) Prior Publication Data
US 2016/0223968 A1 Aug. 4, 2016

(30) Foreign Application Priority Data
Jul. 22, 2014 (JP) .................................. 2014-149112

(51) Int. Cl.
*G03G 15/20* (2006.01)
*B32B 1/08* (2006.01)
*B32B 27/28* (2006.01)

(52) U.S. Cl.
CPC ............ *G03G 15/2057* (2013.01); *B32B 1/08* (2013.01); *B32B 27/281* (2013.01);
(Continued)

(58) Field of Classification Search
CPC ........ G03G 15/2057; G03G 2215/2035; Y10T 428/1397; Y10T 428/31721; B32B 1/08;
(Continued)

(56) References Cited

U.S. PATENT DOCUMENTS 3,728,443 A * 4/1973 Berisford ............. C01G 23/047
117/7
8,263,199 B2 9/2012 Nakajima et al.
2010/0279045 A1 11/2010 Nakajima et al.

FOREIGN PATENT DOCUMENTS

JP H09-137060 A 5/1997
JP 2005-084247 A 3/2005
(Continued)

OTHER PUBLICATIONS

Machine translation of JP 2007-272223. (Year: 2007).*

*Primary Examiner* — John D Freeman
(74) *Attorney, Agent, or Firm* — Drinker Biddle & Reath LLP

(57) ABSTRACT

An object of the present invention is to provide a polyimide tube for a fixing belt, the polyimide tube having good toner fixability. A polyimide tube for a fixing belt of an image-forming apparatus according to the present invention includes a polyimide layer that contains a polyimide as a main component and a needle-like filler, the needle-like filler containing a carbon nanotube and needle-like titanium
(Continued)

oxide. A product of a thermal diffusivity (m²/s) of the polyimide layer and a breaking elongation (%) of the polyimide layer in an axial direction is $35 \times 10^{-7}$ or more. An orientation direction of the needle-like filler is preferably an axial direction or a circumferential direction.

10 Claims, 2 Drawing Sheets

(52) U.S. Cl.
CPC ..... *B32B 2264/10* (2013.01); *B32B 2264/102* (2013.01); *B32B 2264/12* (2013.01); *B32B 2379/08* (2013.01); *B32B 2413/00* (2013.01); *B32B 2433/00* (2013.01); *B32B 2597/00* (2013.01); *G03G 2215/2035* (2013.01); *Y10T 428/1397* (2015.01); *Y10T 428/31721* (2015.04)

(58) Field of Classification Search
CPC .............. B32B 27/281; B32B 2264/10; B32B 2264/102; B32B 2264/12; B32B 2379/08; B32B 2413/00; B32B 2433/00; B32B 2597/00

See application file for complete search history.

(56) References Cited

FOREIGN PATENT DOCUMENTS

| | | |
|---|---|---|
| JP | 2007-272223 A | 10/2007 |
| JP | 2009-156965 A | 7/2009 |
| JP | 2012-141571 A | 7/2012 |
| JP | 2012-225990 A | 11/2012 |
| JP | 2013-181136 A | 9/2013 |

* cited by examiner

POLYIMIDE TUBE FOR FIXING BELTS

TECHNICAL FIELD

The present invention relates to a polyimide tube for a fixing belt.

BACKGROUND ART

In image-forming apparatuses such as a copy machine and a laser beam printer, a heat fixing method is usually employed at the final stage of printing and copy. In this heat fixing method, a material to be transferred such as printing paper to which a toner image has been transferred is allowed to pass between a pressure roller and a fixing belt that includes a heating source therein. An unfixed toner is thereby heat-melted, and the toner is fixed to the material to be transferred to form an image. In general, a fixing belt formed using a synthetic resin such as a polyimide is usually used as the fixing belt.

In recent years, with the realization of high-speed printing or high-speed copy function of image-forming apparatuses, the quality standards, such as fixability, required for a fixing belt have become higher. Therefore, in order to meet the requirements, a fixing belt that uses a polyimide tube whose thermal conductivity is improved by incorporating a needle-like filler is disclosed (Japanese Unexamined Patent Application Publication No. 2009-156965).

CITATION LIST

Patent Literature

PTL 1: Japanese Unexamined Patent Application Publication No. 2009-156965

SUMMARY OF INVENTION

Technical Problem

In the existing fixing belt described above, an improvement of fixability of a toner is expected as a result of the increase in thermal conductivity of the polyimide tube. However, sufficient fixability is obtained only in a certain temperature condition. There is still room for improvement in fixability.

The present invention has been made in view of the circumstances described above. An object of the present invention is to provide a polyimide tube for a fixing belt, the polyimide tube having good toner fixability.

Solution to Problem

As a result of intensive studies, the inventors of the present invention found that high fixability can be achieved by optimizing an elongation of a polyimide tube that forms a fixing belt in addition to a thermal conductivity of the polyimide tube. Specifically, the inventors of the present invention found that fixability is significantly improved by controlling the product of a thermal diffusivity and a breaking elongation to a particular value or more.

Specifically, a polyimide tube for a fixing belt according to an embodiment of the present invention that has been made in order to solve the above problem is a polyimide tube for a fixing belt of an image-forming apparatus, the polyimide tube including a polyimide layer that contains a polyimide as a main component and a needle-like filler, the needle-like filler containing a carbon nanotube and needle-like titanium oxide, in which a product of a thermal diffusivity ($m^2/s$) of the polyimide layer and a breaking elongation (%) of the polyimide layer in an axial direction is $35 \times 10^{-7}$ or more.

Advantageous Effects of Invention

The polyimide tube for a fixing belt according to the present invention has good toner fixability and thus can be suitable for use in a fixing belt of an image-forming apparatus.

DESCRIPTION OF EMBODIMENTS

[Description of Embodiments of Invention]

Figure 1:
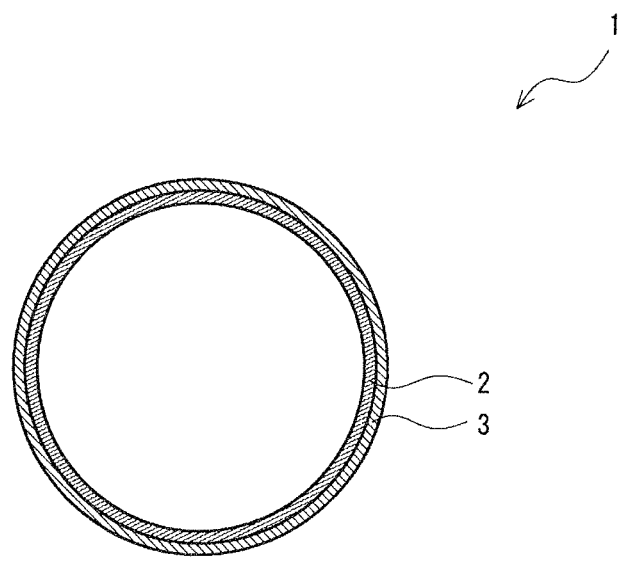
FIG. 1 is a schematic cross-sectional view illustrating a polyimide tube for a fixing belt according to an embodiment of the present invention.

A polyimide tube for a fixing belt according to an embodiment of the present invention is a polyimide tube for a fixing belt of an image-forming apparatus, the polyimide tube including a polyimide layer that contains a polyimide as a main component and a needle-like filler, the needle-like filler containing a carbon nanotube and needle-like titanium oxide, in which a product of a thermal diffusivity ($m^2/s$) of the polyimide layer and a breaking elongation (%) of the polyimide layer in an axial direction is $35 \times 10^{-7}$ or more.

The polyimide tube for a fixing belt includes a polyimide layer that contains, as a filler, a carbon nanotube and needle-like titanium oxide. Accordingly, the polyimide tube has good thermal conductivity while maintaining mechanical strength such as a tensile strength and a compressive strength. The polyimide tube for a fixing belt has a product of a thermal diffusivity of the polyimide layer and a breaking elongation of the polyimide layer in an axial direction of $35 \times 10^{-7}$ or more. Due to the synergistic effects, the polyimide tube for a fixing belt can exhibit good toner fixability.

An orientation direction of the needle-like filler is preferably an axial direction or a circumferential direction. When the needle-like filler is oriented in the axial direction, the polyimide tube has good flexibility. When the needle-like filler is oriented in the circumferential direction, the polyimide tube has good twisting strength (buckling resistance).

The thermal diffusivity of the polyimide layer is preferably $3.5 \times 10^{-7}$ $m^2/s$ or more. By controlling the thermal diffusivity of the polyimide layer to the lower limit or more in this manner, fixability can be more reliably improved.

The breaking elongation of the polyimide layer in the axial direction is preferably 7% or more. By controlling the breaking elongation of the polyimide layer in the axial direction to the lower limit or more in this manner, fixability can be more reliably improved.

The polyimide layer preferably has a modulus of elasticity in the axial direction of 3,000 MPa or less at 150° C. and a modulus of elasticity in a circumferential direction of 5,500 MPa or less at 150° C. By controlling the moduli of elasticity of the polyimide layer to the upper limits or less in this manner, flexibility of the polyimide layer is increased and fixability can be further improved.

The polyimide preferably has a structural unit represented by a formula (1), (2), or (3) below. When the polyimide contained in the polyimide layer has any of these structural units in this manner, thermal conductivity, strength, etc. of the polyimide layer are increased in a balanced manner, and a further improvement in fixability can be achieved.

[Chem. 1]

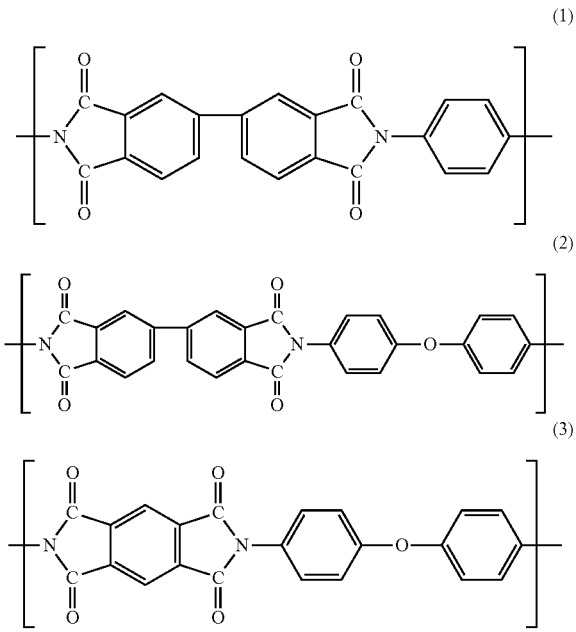

The polyimide tube for a fixing belt preferably further includes a fluorocarbon resin layer formed on an outer circumferential surface of the polyimide layer. By further providing a fluorocarbon resin layer in this manner, a mold-releasing property of the fixing belt can be enhanced.

The term "main component" refers to a component contained in the largest amount, and, for example, a component having a content of 50% by mass or more. The phrase "a needle-like filler is oriented in an axial direction of a polyimide tube for a fixing belt" means that when a polyimide tube is developed into a planar shape, an average of the absolute value of an angle formed by a central axis of a needle-like filler and an axial direction of the polyimide tube is 10° or less in planar view. The phrase "a needle-like filler is oriented in a circumferential direction of a polyimide tube for a fixing belt" means that, similarly, an average of the absolute value of an angle formed by a central axis of a needle-like filler and a circumferential direction of the polyimide tube is 80° or more and 100° or less. The "thermal diffusivity" is a value measured by a temperature wave thermal analysis method in accordance with ISO 22007-3: 2008 and can be measured using, for example, an "ai-Phase Mobile 1u" manufactured by ai-Phase Co., Ltd. The "breaking elongation" is a value measured in accordance with JIS-K7161 (1994). The "modulus of elasticity" is a value measured in accordance with JIS-K7161 (1994).

[Details of Embodiments of Invention]

A polyimide tube for a fixing belt according to an embodiment of the present invention will be described in detail with reference to the drawings.

[Polyimide Tube for Fixing Belt]

A polyimide tube 1 for a fixing belt illustrated in FIG. 1 constitutes a fixing belt of an image-forming apparatus. The polyimide tube 1 for a fixing belt includes a polyimide layer 2 that contains a polyimide as a main component and a needle-like filler, and a fluorocarbon resin layer 3 that contains a fluorocarbon resin as a main component and that is formed on an outer circumferential surface of the polyimide layer 2 either directly or an adhesive therebetween.

The upper limit of an average outer diameter of the polyimide tube 1 for a fixing belt is preferably 100 mm, and more preferably 50 mm. The lower limit of the average outer diameter of the polyimide tube 1 for a fixing belt is preferably 5 mm, and more preferably 10 mm. When the average outer diameter of the polyimide tube 1 for a fixing belt exceeds the upper limit, the use of the polyimide tube 1 for a fixing belt may be limited. On the other hand, when the average outer diameter of the polyimide tube 1 for a fixing belt is less than the lower limit, mechanical strength of the polyimide tube 1 for a fixing belt may be insufficient.

The length of the polyimide tube 1 for a fixing belt can be appropriately designed according to the use.

<Polyimide Layer>

The polyimide layer 2 contains a polyimide serving as a main component and a needle-like filler. The polyimide layer 2 may contain other resins, fillers, and any additive as long as the advantages of the present invention are not impaired. Examples of the other fillers include highly thermally conductive fillers such as boron nitride.

(Polyimide)

A thermosetting polyimide (also referred to as "condensation polyimide") or a thermoplastic polyimide may be used as the polyimide contained as a main component of the polyimide layer 2. Among these, a thermosetting polyimide is preferable from the viewpoint of heat resistance, tensile strength, modulus of elasticity in tension, etc.

The polyimide may be a homopolymer including one structural unit, a copolymer including two or more structural units, or a polymer obtained by blending two or more homopolymers. The polyimide preferably has a structural unit represented by a formula (1), (2), or (3) below.

[Chem. 2]

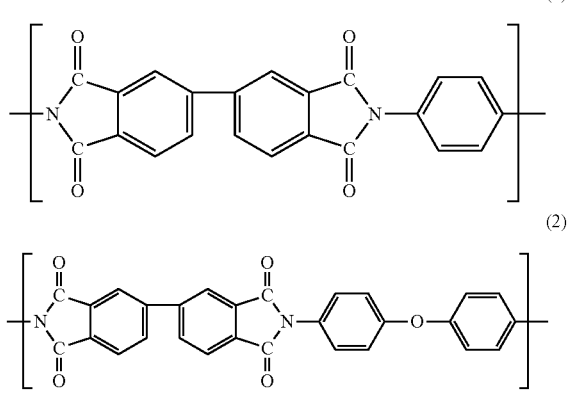

-continued

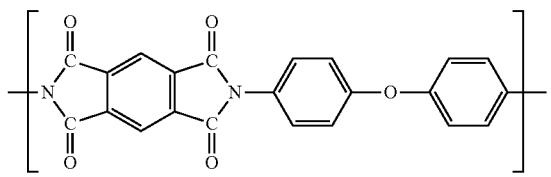
(3)

The structural unit represented by the formula (1) above (hereinafter referred to as "structural unit a") is obtained by, for example, synthesizing a polyamide acid (polyamic acid), which is a polyimide precursor, using 3,3',4,4'-diphenyltetracarboxylic dianhydride and p-phenylenediamine, and imidizing the precursor by heating or the like.

The structural unit represented by the formula (2) above (hereinafter referred to as "structural unit b") is obtained by, for example, synthesizing a polyamide acid, which is a polyimide precursor, using 3,3',4,4'-diphenyltetracarboxylic dianhydride and 4,4'-diaminodiphenyl ether, and imidizing the precursor by heating or the like.

The structural unit represented by the formula (3) above (hereinafter referred to as "structural unit c") is obtained by, for example, synthesizing a polyamide acid, which is a polyimide precursor, using pyromellitic dianhydride and 4,4'-diaminodiphenyl ether, and imidizing the precursor by heating or the like.

In particular, the polyimide is preferably a copolymer having the structural unit a and the structural unit c. The lower limit of the content of the structural unit c of the polyimide is preferably 10% by mass, more preferably 15% by mass, and still more preferably 18% by mass. The upper limit of the content of the structural unit c of the polyimide is preferably 50% by mass, more preferably 40% by mass, and still more preferably 35% by mass. When the content of the structural unit c is less than the lower limit, breaking strength of the polyimide layer 2 may be insufficient. Accordingly, if a foreign substance or the like is engaged, the roller may be broken. On the other hand, when the content of the structural unit c exceeds the upper limit, the breaking elongation of the polyimide layer may be insufficient.

Furthermore, the polyimide may be a copolymer A having the structural unit a and the structural unit b, a copolymer B having the structural unit b and a structural unit represented by a formula (4) below, a copolymer C having the structural unit c and a structural unit represented by a formula (5) below, a copolymer D having the structural unit a and a structural unit represented by a formula (6) below, or a copolymer E having the structural unit a and a structural unit represented by a formula (7) below.

[Chem. 3]

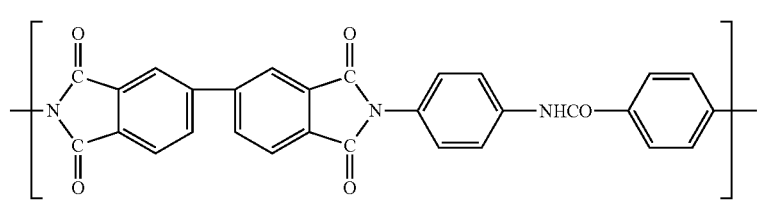
(4)

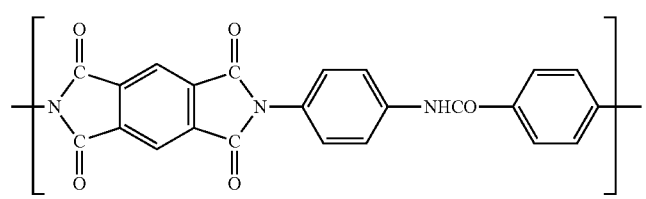
(5)

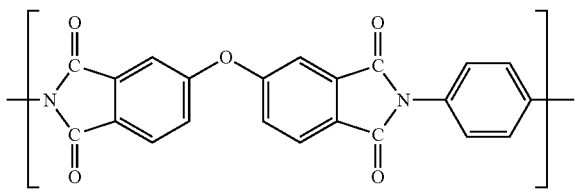
(6)

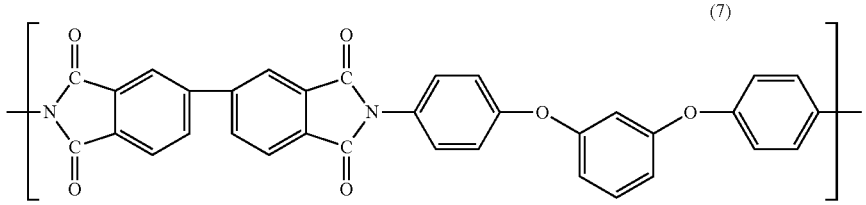
(7)

The copolymer A is obtained by, for example, synthesizing a polyamide acid (polyamic acid), which is a polyimide precursor, using 3,3',4,4'-diphenyltetracarboxylic dianhydride, p-phenylenediamine, and 4,4'-diaminodiphenyl ether, and imidizing the precursor by heating or the like.

The upper limit of a ratio of the structural unit a in the copolymer A is preferably 95% by mass, and more preferably 90% by mass. The lower limit of the ratio of the structural unit a in the copolymer A is preferably 25% by mass, and more preferably 30% by mass. By controlling the ratio of the structural unit a in the copolymer A in the above range, both rigidity and flexibility of the polyimide can be improved.

The copolymer B is obtained by, for example, synthesizing a polyamide acid (polyamic acid), which is a polyimide precursor, using 3,3',4,4'-diphenyltetracarboxylic dianhydride, 4,4'-diaminodiphenyl ether, and 4,4'-diaminobenzanilide, and imidizing the precursor by heating or the like.

The upper limit of a ratio of the structural unit b in the copolymer B is preferably 75% by mass, and more preferably 70% by mass. The lower limit of the ratio of the structural unit b in the copolymer B is preferably 5% by mass, and more preferably 10% by mass. By controlling the ratio of the structural unit b in the copolymer B to be in the above range, both rigidity and flexibility of the polyimide can be improved.

The copolymer C is obtained by, for example, synthesizing a polyamide acid (polyamic acid), which is a polyimide precursor, using pyromellitic dianhydride, 4,4'-diaminodiphenyl ether, and 4,4'-diaminobenzanilide, and imidizing the precursor by heating or the like.

The upper limit of a ratio of the structural unit c in the copolymer C is preferably 75% by mass, and more preferably 70% by mass. The lower limit of the ratio of the structural unit c in the copolymer C is preferably 5% by mass, and more preferably 10% by mass. By controlling the ratio of the structural unit c in the copolymer C in the above range, both rigidity and flexibility of the polyimide can be improved.

The copolymer D is obtained by, for example, synthesizing a polyamide acid (polyamic acid), which is a polyimide precursor, using 3,3',4,4'-diphenyltetracarboxylic dianhydride, p-phenylenediamine, and oxydiphthalic dianhydride, and imidizing the precursor by heating or the like.

The upper limit of a ratio of the structural unit a in the copolymer D is preferably 95% by mass, and more preferably 90% by mass. The lower limit of the ratio of the structural unit a in the copolymer D is preferably 25% by mass, and more preferably 30% by mass. By controlling the ratio of the structural unit a in the copolymer D in the above range, both rigidity and flexibility of the polyimide can be improved.

The copolymer E is obtained by, for example, synthesizing a polyamide acid (polyamic acid), which is a polyimide precursor, using 3,3',4,4'-diphenyltetracarboxylic dianhydride, p-phenylenediamine, and resorcin oxydianiline, and imidizing the precursor by heating or the like.

The upper limit of a ratio of the structural unit a in the copolymer E is preferably 95% by mass, and more preferably 90% by mass. The lower limit of the ratio of the structural unit a in the copolymer E is preferably 25% by mass, and more preferably 30% by mass. By controlling the ratio of the structural unit a in the copolymer E in the above range, both rigidity and flexibility of the polyimide can be improved.

The upper limit of a modulus of elasticity of the polyimide layer at 150° C. in the axial direction is preferably 3,000 MPa, and more preferably 2,500 MPa. The lower limit of the modulus of elasticity of the polyimide layer at 150° C. in the axial direction is preferably 1,000 MPa. Furthermore, the upper limit of the modulus of elasticity of the polyimide layer at 150° C. in the circumferential direction is preferably 5,500 MPa, and more preferably 5,000 MPa. The lower limit of the modulus of elasticity of the polyimide layer at 150° C. in the circumferential direction is preferably 2,000 MPa. When the modulus of elasticity of the polyimide layer exceeds the upper limit, flexibility of the polyimide tube 1 for a fixing belt may decrease. On the other hand, when the modulus of elasticity of the polyimide layer is less than the lower limit, shape stability of the polyimide tube 1 for a fixing belt may be insufficient.

(Needle-like Filler)

The needle-like filler contained in the polyimide layer 2 contains a carbon nanotube and needle-like titanium oxide. The polyimide layer 2 may contain a needle-like filler other than these.

The needle-like filler is preferably oriented in the axial direction or the circumferential direction of the polyimide tube 1 for a fixing belt. That is, the needle-like filler is preferably contained in the polyimide layer 2 in a state where the needle-like filler is oriented so that the longitudinal direction thereof is parallel or perpendicular to the axial direction of the tube.

The carbon nanotube (hereinafter may be referred to as "CNT") is nano-sized cylindrical carbon. In general, carbon nanotubes have a specific gravity of about 2.0, and an aspect ratio (ratio of the length to the diameter) of 50 or more and 1,000 or less. Carbon nanotubes are typically classified into single-wall CNTs and multi-wall CNTs. The multi-wall CNTs have a structure in which a plurality of tubular carbon materials are concentrically arranged. Any known method may be employed as a method for producing the carbon nanotube, A vapor-phase growth method with which the diameter of a carbon nanotube is easily controlled and which has good mass productivity is preferable.

The upper limit of an average diameter of the carbon nanotube is preferably 300 nm, and more preferably 200 nm. The lower limit of the average diameter of the carbon nanotube is preferably 100 nm. When the average diameter of the carbon nanotube exceeds the upper limit, flexibility and surface smoothness of the polyimide layer 2 may decrease. When the average diameter of the carbon nanotube is less than the lower limit, dispersibility of the carbon nanotube decreases, which may result in a decrease in the mechanical strength of the polyimide layer 2, and productivity of the carbon nanotube may decrease. The term "average diameter of a carbon nanotube" refers to an average of the minor axis diameter of a carbon nanotube measured by, for example, a laser scattering method or observation with a scanning electron microscope.

The upper limit of an average length of the carbon nanotube is preferably 50 μm, more preferably 30 μm, and still more preferably 20 μm. The lower limit of the average length of the carbon nanotube is preferably 1 μm. When the average length of the carbon nanotube exceeds the upper limit, dispersibility of the carbon nanotube decreases, which may result in a decrease in the mechanical strength of the polyimide layer 2, and surface smoothness of the polyimide layer 2 may decrease. When the average length of the carbon nanotube is less than the lower limit, mechanical strength, such as breaking elongation, of the polyimide layer 2 may be insufficient. The term "average length of a carbon nanotube" refers to an average of the length of a carbon nanotube measured by, for example, a laser scattering method or observation with a scanning electron microscope.

The upper limit of an average diameter of needle-like titanium oxide is preferably 5 μm, and more preferably 3 μm.

The lower limit of the average diameter of needle-like titanium oxide is preferably 0.1 µm. When the average diameter of needle-like titanium oxide exceeds the upper limit, flexibility and surface smoothness of the polyimide layer 2 may decrease. When the average diameter of needle-like titanium oxide is less than the lower limit, dispersibility of needle-like titanium oxide decreases, which may result in a decrease in the mechanical strength of the polyimide layer 2. The term "average diameter of needle-like titanium oxide" refers to an average of the minor axis diameter of needle-like titanium oxide measured by, for example, a laser scattering method or observation with a scanning electron microscope.

The upper limit of an average length of needle-like titanium oxide is preferably 200 µm, more preferably 100 µm, and still more preferably 50 µm. The lower limit of the average length of needle-like titanium oxide is preferably 1 µm. When the average length of needle-like titanium oxide exceeds the upper limit, dispersibility of the needle-like titanium oxide decreases, which may result in a decrease in the mechanical strength of the polyimide layer 2, and surface smoothness of the polyimide layer 2 may decrease. When the average length of needle-like titanium oxide is less than the lower limit, mechanical properties, such as breaking elongation, of the polyimide layer 2 may be insufficient. The term "average length of needle-like titanium oxide" refers to an average of the length of needle-like titanium oxide measured by, for example, a laser scattering method or observation with a scanning electron microscope.

In general, the aspect ratio of needle-like titanium oxide is 10 or more and 100 or less.

The upper limit of the content of the total of the needle-like filler in the polyimide layer 2 is preferably 30% by volume, and more preferably 25% by volume. The lower limit of the content of the total of the needle-like filler in the polyimide layer 2 is preferably 10% by volume, and more preferably 15% by volume.

The upper limit of the content of the carbon nanotube in the polyimide layer 2 is preferably 25% by volume, and more preferably 20% by volume. The lower limit of the content of the carbon nanotube in the polyimide layer 2 is preferably 5% by volume, and more preferably 10% by volume.

The upper limit of the content of needle-like titanium oxide in the polyimide layer 2 is preferably 10% by volume, and more preferably 8% by volume. The lower limit of the content of needle-like titanium oxide in the polyimide layer 2 is preferably 1% by volume, and more preferably 3% by volume.

When the content of the total of the needle-like filler, the carbon nanotube, or needle-like titanium oxide in the polyimide layer 2 exceeds the upper limit, breaking elongation of the polyimide layer 2 may be insufficient. When the content of the total of the needle-like filler, the carbon nanotube, or needle-like titanium oxide in the polyimide layer 2 is less than the lower limit, thermal conductivity of the polyimide layer 2 may be insufficient. The content of the needle-like filler may be measured using, for example, a thermogravimetric analysis (TGA) device.

The needle-like filler may be subjected to a surface treatment with a coupling agent or the like in order to enhance adhesiveness with the polyimide.

(Properties of Polyimide Layer)

The lower limit of an average thickness of the polyimide layer 2 is preferably 10 µm, more preferably 20 µm, and still more preferably 30 µm. The upper limit of the average thickness of the polyimide layer 2 is preferably 150 µm, more preferably 120 µm, and still more preferably 100 µm. When the average thickness of the polyimide layer 2 is less than the lower limit, mechanical strength of the polyimide layer 2 may be insufficient. When the average thickness of the polyimide layer 2 exceeds the upper limit, the production cost increases, and the size of the polyimide tube 1 for a fixing belt may be unnecessarily large.

The lower limit of the thermal diffusivity of the polyimide layer 2 is preferably $3.5 \times 10^{-7}$ m²/s, more preferably $4 \times 10^{-7}$ m²/s, and still more preferably $5 \times 10^{-7}$ m²/s. The upper limit of the thermal diffusivity of the polyimide layer 2 is preferably $10 \times 10^{-7}$ m²/s. When the thermal diffusivity of the polyimide layer 2 is less than the lower limit, fixability of the polyimide tube 1 for a fixing belt may be insufficient. When the thermal diffusivity of the polyimide layer 2 exceeds the upper limit, the content of the needle-like filler and the like increases, which may result in an increase in the production cost.

The lower limit of the breaking elongation of the polyimide layer 2 in the axial direction is preferably 7%, more preferably 7.5%, and still more preferably 8%. The upper limit of the breaking elongation of the polyimide layer 2 in the axial direction is preferably 15%. When the breaking elongation of the polyimide layer 2 in the axial direction is less than the lower limit, flexibility of the polyimide tube 1 for a fixing belt decreases, and fixability may be insufficient. When the breaking elongation of the polyimide layer 2 in the axial direction exceeds the upper limit, shape stability of the polyimide tube 1 for a fixing belt may be insufficient.

The lower limit of the product of the thermal diffusivity and the breaking elongation of the polyimide layer 2 in the axial direction is $35 \times 10^{-7}$, preferably $38 \times 10^{-7}$, and still more preferably $40 \times 10^{-7}$. The upper limit of the product of the thermal diffusivity and the breaking elongation of the polyimide layer 2 in the axial direction is preferably $100 \times 10^{-7}$. When the product is less than the lower limit, fixability of the polyimide tube 1 for a fixing belt may be insufficient. When the product exceeds the upper limit, the production cost of the polyimide tube 1 for a fixing belt may be excessively high.

(Fluorocarbon Resin Layer)

The fluorocarbon resin layer 3 is formed for the purpose of providing a mold-releasing property to the fixing belt and preventing a toner on a material to be transferred from attaching to a surface of the fixing belt. The fluorocarbon resin layer 3 contains a fluorocarbon resin as a main component. The fluorocarbon resin preferably has good heat resistance. Examples of the fluorocarbon resin include polytetrafluoroethylene (PTFE), tetrafluoroethylene/perfluoroalkyl vinyl ether copolymers (PFA), and tetrafluoroethylene/hexafluoropropylene copolymers (FEP).

The fluorocarbon resin layer 3 may be formed using a fluorocarbon resin alone. However, in order to prevent offset due to charging, an electrically conductive filler is preferably incorporated. Examples of the electrically conductive filler include electrically conductive carbon black such as Ketjenblack, metal oxides such as tin oxide, and powders of a metal such as aluminum.

The lower limit of the content of the electrically conductive filler in the fluorocarbon resin layer 3 is 0.5% by mass, and more preferably 1% by mass. The upper limit of the content of the electrically conductive filler in the fluorocarbon resin layer 3 is preferably 15% by mass, and more preferably 10% by mass. When the content of the electrically conductive filler is less than the lower limit, sufficient electrical conductivity may not be provided to the fluorocarbon resin layer 3. When the content of the electrically conductive filler exceeds the upper limit, flexibility, mechanical strength, etc. of the fluorocarbon resin layer 3 may decrease.

The lower limit of an average thickness of the fluorocarbon resin layer 3 is preferably 1 µm, and more preferably 5 µm. The upper limit of the average thickness of the fluorocarbon resin layer 3 is preferably 30 µm, and more preferably 15 µm. When the average thickness of the fluorocarbon resin layer 3 is less than the lower limit, mechanical strength of the fluorocarbon resin layer 3 may be insufficient. When the average thickness of the fluorocarbon resin layer 3 exceeds the upper limit, the production cost is increased, and the size of the polyimide tube 1 for a fixing belt may be unnecessarily large.

The fluorocarbon resin layer 3 may contain other resins, fillers, and any additive as long as the advantages of the present invention are not impaired.

The fluorocarbon resin layer 3 may be formed on the polyimide layer 2 directly. Alternatively, in order to enhance adhesiveness, the fluorocarbon resin layer 3 may be formed on the polyimide layer 2 with an adhesive therebetween. From the viewpoint of heat resistance, the adhesive preferably contains a heat-resistant resin as a main component. Examples of the heat-resistant resin preferably include a mixture of a fluorocarbon resin and a polyamide-imide and a mixture of a fluorocarbon resin and polyethersulfone.

The adhesive may contain an electrically conductive filler. By incorporating an electrically conductive filler in the adhesive, a shield effect against frictional charging on the inner circumferential surface of the fixing belt and an effect of preventing charging on the outer circumferential surface are increased, and thus offset can be effectively prevented. As the electrically conductive filler incorporated in the adhesive, the same electrically conductive filler as that used in the fluorocarbon resin layer 3 may be used.

The lower limit of an average thickness of an adhesive layer formed by the adhesive is preferably 0.1 µm, and more preferably 1 µm. The upper limit of the average thickness of the adhesive layer is preferably 20 µm, and more preferably 10 µm. When the average thickness of the adhesive layer is less than the lower limit, an adhesive strength of the fluorocarbon resin layer 3 and the polyimide layer 2 may not be sufficiently improved. When the average thickness of the adhesive layer exceeds the upper limit, the production cost increases, and the size of the polyimide tube 1 for a fixing belt may be unnecessarily large.

<Production Method>

The polyimide tube 1 for a fixing belt can be easily and reliably produced by, for example, a production method including a step of applying a polyimide varnish onto a columnar core body, a step of forming a polyimide layer 2 by curing the applied polyimide varnish, a step of detaching the polyimide layer 2 from the columnar core body, and a step of forming a fluorocarbon resin layer 3 on an outer circumferential surface of the polyimide layer 2.

(Polyimide Varnish-applying Step)

Figure 2:
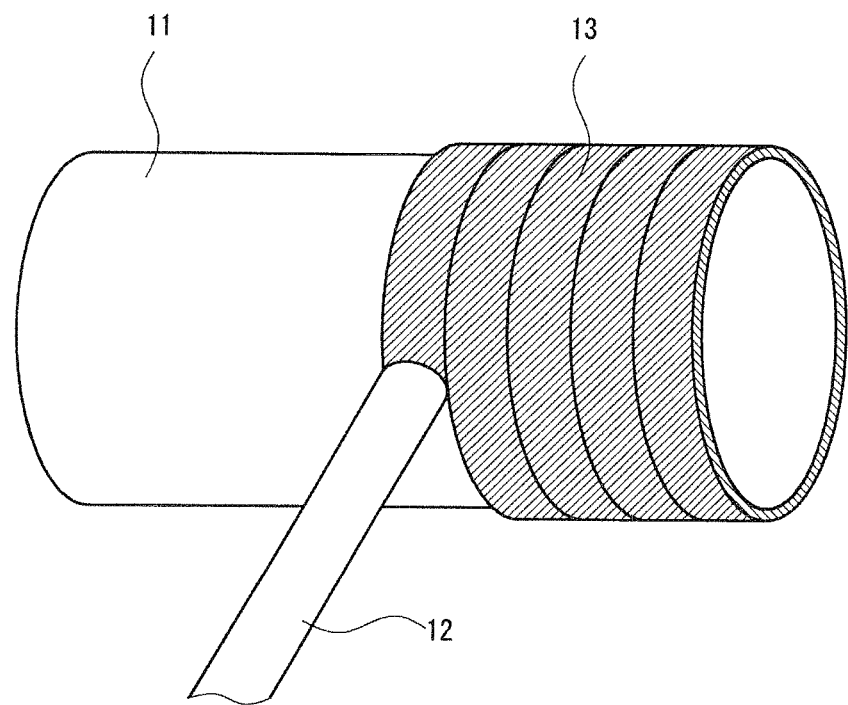
FIG. 2 is a schematic perspective view illustrating a step of a method for producing the polyimide tube for a fixing belt illustrated in FIG. 1.

In the step of applying a polyimide varnish, for example, as illustrated in FIG. 2, a polyimide varnish that forms a polyimide layer 2 is applied onto a columnar core body 11 to form a coating layer 13. The columnar core body 11 may be solid or hollow. When the columnar core body 11 is solid, the polyimide varnish is applied onto an outer circumferential surface of the columnar core body 11. When the columnar core body 11 is hollow, the polyimide varnish is applied onto an outer circumferential surface or an inner circumferential surface of the columnar core body 11.

Examples of the material of the columnar core body 11 that can be used include metals such as aluminum, aluminum alloys, iron, and stainless steels; ceramics such as alumina and silicon carbide; and heat-resistant resins such as polyimides, polyamide-imides, polybenzimidazole, and polybenzoxazole.

On the surface of the columnar core body 11 to which the polyimide varnish has been applied, preferably, a mold-releasing agent such as silicone oil is applied or ceramic coating or the like is performed. Examples of the ceramic coating that can be used include silica, alumina, zirconia, silicon nitride, and the like coated by a sol-gel method; alumina, zirconia, and the like coated by a thermal spraying method; and aluminum nitride and the like coated by a sputtering method. Among these, ceramic coating by the sol-gel method, which does not require an expensive apparatus and in which a coating operation is easily performed, is preferable.

The polyimide varnish contains a polyimide precursor that forms a polyimide of the polyimide layer 2, a needle-like filler, and an organic solvent. For example, N-methylpyrrolidone or the like may be used as the organic solvent.

A dispersing agent may be added to the polyimide varnish. The dispersing agent is not particularly limited as long as the dispersing agent enhances dispersibility of the needle-like filler. For example, a surfactant may be used as the dispersing agent. The lower limit of the amount of dispersing agent added to the needle-like filler is preferably 0.1% by mass, and more preferably 0.3% by mass. The upper limit of the amount of dispersing agent added to the needle-like filler is preferably 20% by mass, and more preferably 10% by mass. When the amount of dispersing agent added is less than the lower limit, dispersibility of the needle-like filler may be insufficient. When the amount of dispersing agent added exceeds the upper limit, mechanical strength etc. of the polyimide layer 2 may decrease.

The upper limit of a viscosity of the polyimide varnish at 25° C. is preferably 1,500 Pa·s, and more preferably 300 Pa·s. The lower limit of the viscosity of the polyimide varnish at 25° C. is preferably 10 Pa·s. When the viscosity of the polyimide varnish at 25° C. exceeds the upper limit, irregularities tend to be formed on the coating layer 13 during the application of the polyimide varnish. When the viscosity of the polyimide varnish at 25° C. is less than the lower limit, dripping or crawling may occur during the application or curing of the polyimide varnish.

As a specific method for applying a polyimide varnish, for example, a so-called dipping method is suitably used. Specifically, coating is performed by dipping a columnar core body in a vessel filled with a polyimide varnish and pulling up the columnar core body so that a length direction of the columnar core body corresponds to the vertical direction. With this method, the orientation direction of the needle-like filler can be made to the axial direction of the polyimide tube.

As another method for applying a polyimide varnish, a method for performing coating with a dispenser is also suitably used. In this method, a polyimide varnish is continuously applied onto an outer circumferential surface or an inner circumferential surface of a columnar core body 11 while the columnar core body 11 is rotated about the axis of the columnar core body 11 and a nozzle 12 of a dispenser is relatively moved in the axial direction of the columnar core body 11. With this method, the polyimide varnish is applied onto the columnar core body 11 in a spiral manner, and the orientation direction of the needle-like filler can be made to the circumferential direction of the polyimide tube.

The nozzle 12 of the dispenser is preferably brought into contact with the outer circumferential surface or the inner circumferential surface of the columnar core body 11. Furthermore, the product V·R (mm) of a moving speed V (mm/s) of the dispenser nozzle 12 in the axial direction of the columnar core body 11 and the rotational speed R ($s^{-1}$) of the columnar core body 11 is preferably less than 3, and more preferably less than 1.5. By adjusting the moving speed of the dispenser nozzle 12 and the rotational speed of the columnar core body 11, the polyimide varnish is effectively mixed near the nozzle 12, and the generation of a striped pattern due to a coating path and irregularities of the coating layer 13 can be prevented.

A synthetic resin tube, a rubber tube, a metal tube, or the like may be used as the nozzle 12 of the dispenser. Among these, a tube containing, as a main component, polytetrafluoroethylene or a tetrafluoroethylene/perfluoroalkyl vinyl ether copolymer is preferable from the viewpoint of rigidity and prevention of scratches on the surface of the core body.

(Polyimide Layer-forming Step)

In the step of forming a polyimide layer, a polyimide layer 2 is formed by curing the polyimide varnish applied to the columnar core body 11. The curing of the polyimide varnish is specifically performed by heating. The polyimide precursor in the polyimide varnish is imidized by heating, and the tubular polyimide layer 2 is formed.

(Detachment Step)

In the step of detachment, the polyimide layer 2 is detached from the columnar core body 11.

(Fluorocarbon Resin Layer-forming Step)

In the step of forming a fluorocarbon resin layer, a fluorocarbon resin layer 3 is formed on the outer circumferential surface of the polyimide layer 2. Examples of the method for forming the fluorocarbon resin layer 3 include a method in which a fluorocarbon resin varnish containing a fluorocarbon resin is applied onto the outer circumferential surface of the polyimide layer 2 and is baked, and a method in which the polyimide layer 2 is covered with a fluorocarbon resin tube, and the fluorocarbon resin tube is thermally shrunk. In the case where the fluorocarbon resin layer 3 is formed on the outer circumferential surface of the polyimide layer 2 with an adhesive therebetween, the adhesive is applied to the outer circumferential surface of the polyimide layer 2 or the inner circumferential surface of a fluorocarbon resin tube, and the fluorocarbon resin layer 3 is then formed by the method described above. Thus, the polyimide tube 1 for a fixing belt is obtained.

The step of forming a fluorocarbon resin layer may be performed before the step of detachment. Furthermore, the step of forming a polyimide layer may be performed by heating after the application of the fluorocarbon resin varnish or covering with the fluorocarbon resin tube.

That is, after a polyimide varnish is applied onto the columnar core body 11, the solvent of the polyimide varnish is removed by drying, the application of a fluorocarbon resin varnish or covering with a fluorocarbon resin tube is then conducted, and lastly, imidization of the polyimide precursor and baking or shrinking of the fluorocarbon resin may be performed at the same time by heating.

<Advantages>

The polyimide tube 1 for a fixing belt includes the polyimide layer 2 that contains, as a filler, a carbon nanotube and needle-like titanium oxide. Therefore, the polyimide tube 1 has good thermal conductivity while maintaining mechanical strength such as a tensile strength and a compressive strength. Furthermore, in the polyimide tube 1 for a fixing belt, the product of a thermal diffusivity and a breaking elongation of the polyimide layer 2 in the axial direction is $35 \times 10^{-7}$ or more. By the synergistic effects, the polyimide tube 1 for a fixing belt can exhibit good toner fixability. Furthermore, when the needle-like fillers in the polyimide tube 1 for a fixing belt are oriented in the axial direction, variations in the temperature of the tube in the axial direction can be suppressed. For example, during printing, since paper does not pass through the ends of the tube, the temperature of the ends of the tube easily increases compared with a central portion in contact with the paper. However, when the needle-like fillers are oriented in the axial direction, heat at the ends is easily transferred to the central portion and the temperature becomes uniform. On the other hand, when the needle-like fillers are oriented in the circumferential direction, good twisting strength (buckling resistance) is obtained.

[Image-forming Apparatus]

Figure 3:
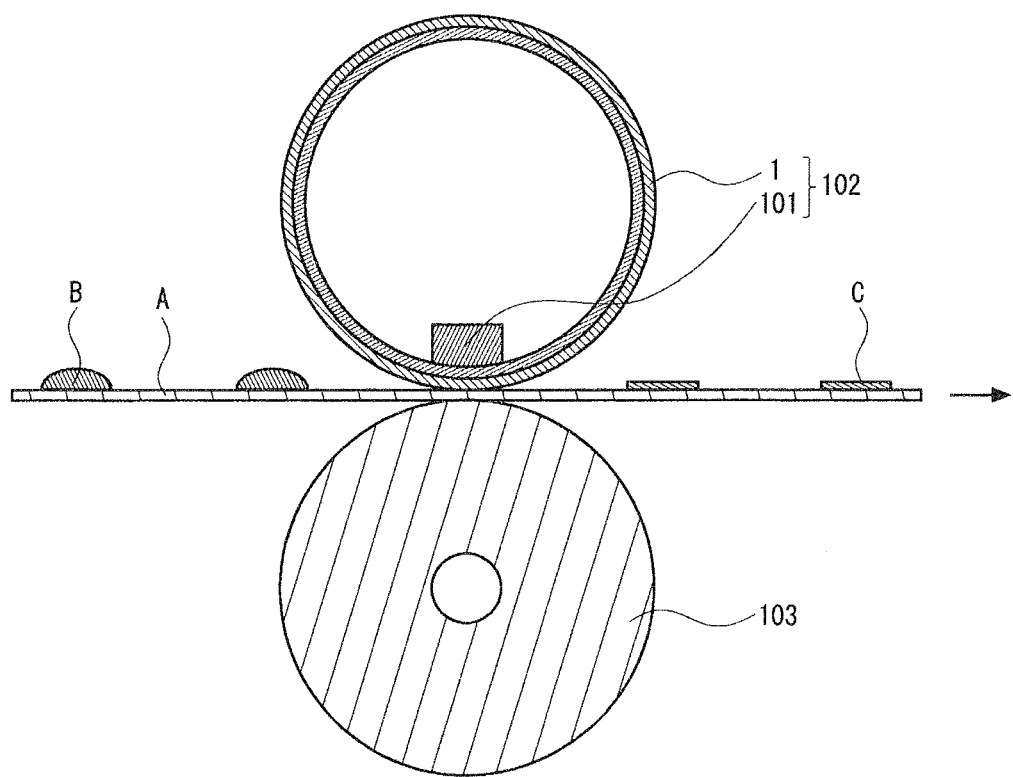
FIG. 3 is a schematic cross-sectional view illustrating the relevant part of an image-forming apparatus that uses the polyimide tube for a fixing belt illustrated in FIG. 1.

An image-forming apparatus in FIG. 3 is an electrophotographic image-forming apparatus and includes a fixing belt 102 that includes the polyimide tube 1 for a fixing belt and a heater 101 disposed inside the polyimide tube 1 for a fixing belt, and a pressure roller 103 arranged to form a pair with the fixing belt 102. In this image-forming apparatus, a material to be transferred A having an unfixed toner B on a surface thereof is heated and pressed between the fixing belt 102 and the pressure roller 103, thereby fixing the unfixed toner B and forming a fixed toner C.

According to the image-forming apparatus that includes, as a fixing belt, the polyimide tube 1 for a fixing belt, the polyimide tube 1 for a fixing belt has good fixability. Accordingly, heating temperature can be reduced, and cold offset can be effectively prevented. As a result, the image-forming apparatus has good image clarity.

[Other Embodiments]

It is to be understood that the embodiments disclosed herein are only illustrative and are not restrictive in all respects. The scope of the present invention is not limited to the configurations of the above embodiments but is defined by the claims described below. It is intended that the scope of the present invention includes equivalents of the claims and all modifications within the scope of the claims.

The polyimide tube for a fixing belt of the above embodiment includes a fluorocarbon resin layer on an outer circumferential surface of the polyimide layer. However, the fluorocarbon resin layer may be omitted according to the use.

Figure 4:
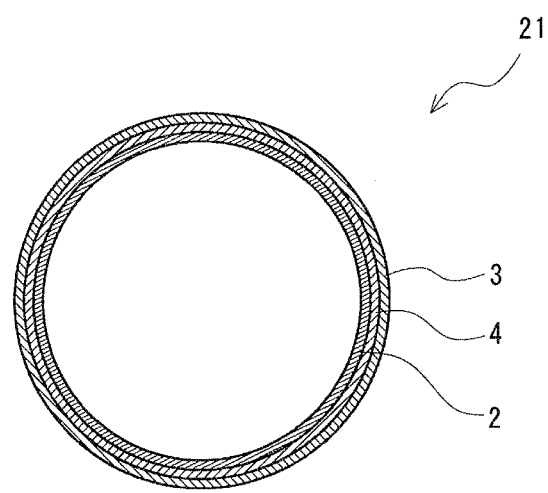
FIG. 4 is a schematic cross-sectional view illustrating a polyimide tube for a fixing belt according to an embodiment different from the embodiment illustrated in FIG. 1.

Furthermore, as in a polyimide tube 21 for a fixing belt illustrated in FIG. 4, a resin layer or a rubber layer other than an adhesive layer may be additionally formed, as an intermediate layer 4, between the polyimide layer 2 and the fluorocarbon resin layer 3 as long as the object of the present invention is not impaired.

EXAMPLES

The present invention will be described more specifically using Examples. However, the present invention is not limited to the Examples below.

(Nos. 1 to 13)

First, a polyimide varnish 1 ("U-varnish S" manufactured by Ube Industries Ltd.) containing a polyimide precursor that provides the structural unit represented by the formula (1) above and a polyimide varnish 2 ("Pyre-ML" manufactured by I.S.T Corporation) containing a polyimide precursor that provides the structural unit represented by the formula (3) above were mixed so that the mass ratio of these structural units (a and c) became the value shown in Table I. Furthermore, a carbon nanotube and needle-like titanium oxide were mixed with the resulting varnish in the volume ratio relative to the polyimide precursor shown in Table I to prepare a coating liquid. As the carbon nanotube, "VGCF-H" manufactured by Showa Denko K.K. and having an average diameter of 150 nm, an average length of 8 μm, and a specific gravity of 2.1 was used. As the needle-like titanium oxide, "FTL300" manufactured by Ishihara Sangyo Kaisha Ltd. and having an average diameter of 0.27 μm, an average length of 5.15 μm, and a specific gravity of 4.1 was used.

Next, a columnar aluminum core body whose outer circumferential surface was coated with a ceramic and which had an outer diameter of 20 mm was prepared. The coating liquid was applied onto the outer circumferential surface of the columnar core body. Specifically, a nozzle of a dispenser was brought into contact with the outer circumferential surface of the columnar core body, a constant amount of the coating liquid was supplied from the dispenser nozzle to the outer circumferential surface of the columnar core body while rotating the columnar core body and moving the nozzle in the axial direction of the columnar core body at a constant speed. A PTFE tube having an inner diameter of 2 mm and an outer diameter of 4 mm was used as the dispenser nozzle. The nozzle was moved from a position (supply start position) 20 mm away from an end of the columnar core body to a position (supply stop position) 20 mm away from another end thereof. After the application of the coating liquid, the columnar core body was heated stepwise to 400° C. while rotating the columnar core body. After cooling, the resulting cured polyimide layer was detached from the columnar core body. Thus, polyimide tube Nos. 1 to 13 for fixing belts, the polyimide tubes being formed of a polyimide layer, were obtained. The polyimide tubes for fixing belts obtained as described above had an average thickness of 80 μm, an outer diameter of 24.2 mm, and a length of 233 mm.

(Measurement)

A thermal diffusivity of each of the polyimide tube Nos. 1 to 13 for fixing belts was measured. Specifically, the thermal diffusivity was measured at 23° C. using an "ai-Phase Mobile 1u" manufactured by ai-Phase Co., Ltd.

A breaking elongation of each of the polyimide tube Nos. 1 to 13 for fixing belts in the axial direction was measured in accordance with JIS-K7161 (1994).

Table I shows the measurement results of the thermal diffusivity and the breaking elongation, and the product of the thermal diffusivity and the breaking elongation.

(Evaluation)

Fixability of the polyimide tube Nos. 1 to 13 for fixing belts was evaluated by a procedure described below. First, a polyimide tube is fixed to an aluminum sheet in a planar manner. Next, a toner is sprinkled on the polyimide tube, and heating is performed until the temperature becomes 150° C. Subsequently, paper is pressed onto the toner and rubbed five times. The paper is then removed, and whether or not the toner is transferred to the paper is examined. The evaluation was performed on the basis of the criteria described below. Table I shows the results.

A: The toner is completely transferred to the paper.

B: Most of the toner is transferred to the paper.

C: A large amount of the toner remains on the polyimide tube.

TABLE I

| | Coating liquid | | | | Thermal diffusivity $10^{-7}$ m²/s | Breaking elongation % | Thermal diffusivity × Breaking elongation — | Fixability test — |
|---|---|---|---|---|---|---|---|---|
| | Structural unit a mass % | Structural unit c mass % | Carbon nanotube volume % | Needle-like titanium oxide volume % | | | | |
| No. 1 | 85 | 15 | 10.0 | 5.0 | 3.7 | 8.0 | 29.6 | C |
| No. 2 | 85 | 15 | 12.0 | 5.0 | 4.5 | 6.8 | 30.7 | C |
| No. 3 | 85 | 15 | 14.0 | 5.0 | 4.8 | 6.0 | 28.8 | C |
| No. 4 | 85 | 15 | 12.0 | 3.0 | 4.5 | 7.8 | 35.1 | B |
| No. 5 | 80 | 20 | 12.0 | 5.0 | 4.4 | 9.2 | 40.4 | A |
| No. 6 | 80 | 20 | 12.0 | 7.5 | 4.4 | 7.3 | 31.9 | C |
| No. 7 | 80 | 20 | 10.0 | 5.0 | 3.8 | 10.6 | 40.3 | A |
| No. 8 | 70 | 30 | 10.0 | 5.0 | 3.8 | 9.5 | 36.1 | B |
| No. 9 | 70 | 30 | 12.0 | 5.0 | 4.7 | 8.7 | 40.7 | A |
| No. 10 | 70 | 30 | 14.0 | 5.0 | 5.2 | 8.5 | 44.2 | A |
| No. 11 | 70 | 30 | 16.0 | 5.0 | 5.8 | 8.2 | 47.6 | A |
| No. 12 | 70 | 30 | 18.0 | 5.0 | 6.3 | 7.2 | 45.2 | A |
| No. 13 | 70 | 30 | 20.0 | 5.0 | 7.0 | 5.2 | 36.2 | B |

As shown in Table I, the polyimide tube Nos. 4, 5, and 7 to 13 for fixing belts, the polyimide tubes having a product of the thermal diffusivity and the breaking elongation of $35 \times 10^{-7}$ or more, had good fixability. In particular, Nos. 5, 7, and 9 to 12 having a product of $40 \times 10^{-7}$ or more had significantly improved fixability.

Next, varnishes the same as the varnishes used in Nos. 1 to 13, namely, the polyimide varnish 1 containing the polyimide precursor that provides the structural unit represented by the formula (1) above and the polyimide varnish 2 containing the polyimide precursor that provides the structural unit represented by the formula (3) above were mixed so that the mass ratio of these structural units became the value shown in Table II. Furthermore, the carbon nanotube and the needle-like titanium oxide used in Nos. 1 to 13 were mixed with the resulting varnish in the volume ratio relative to the polyimide precursor shown in Table II to prepare a coating liquid.

Next, the coating liquid was applied onto an outer circumferential surface of a columnar aluminum core body whose outer circumferential surface was coated with a ceramic and which had an outer diameter of 20 mm. Specifically, coating was performed by dipping the columnar core body in a stainless vessel filled with the coating liquid, and pulling up the columnar core body so that a length direction thereof corresponded to the vertical direction. After the application, the columnar core body was heated stepwise to 400° C. After cooling, the resulting cured polyimide layer was detached from the columnar core body.

Thus, polyimide tube Nos. 14 to 19 for fixing belts, the polyimide tubes being formed of a polyimide layer, were obtained. The polyimide tubes for fixing belts obtained as described above had an average thickness of 80 μm, an outer diameter of 24.2 mm, and a length of 233 mm.

The thermal diffusivity, the breaking elongation in the axial direction, and fixability of each of the polyimide tube Nos. 14 to 19 for fixing belts were measured and evaluated as in Nos. 1 to 13. Table II shows the measurement results and the evaluation results.

TABLE II

|  | Coating liquid | | | | | Thermal | | |
| --- | --- | --- | --- | --- | --- | --- | --- | --- |
|  | Structural unit a mass % | Structural unit c mass % | Carbon nanotube volume % | Needle-like titanium oxide volume % | Thermal diffusivity $10^{-7}$ m²/s | Breaking elongation % | diffusivity × Breaking elongation — | Fixability test — |
| No. 14 | 80 | 20 | 12.0 | 5.0 | 4.4 | 8.5 | 37.4 | B |
| No. 15 | 80 | 20 | 10.0 | 5.0 | 3.8 | 9.8 | 37.2 | B |
| No. 16 | 70 | 30 | 12.0 | 5.0 | 4.7 | 8.0 | 37.6 | B |
| No. 17 | 70 | 30 | 14.0 | 5.0 | 5.2 | 7.8 | 40.6 | A |
| No. 18 | 70 | 30 | 16.0 | 5.0 | 5.8 | 7.5 | 43.5 | A |
| No. 19 | 70 | 30 | 18.0 | 5.0 | 6.3 | 6.6 | 41.6 | A |

As shown in Table II, each of the polyimide tube Nos. 14 to 19 obtained by forming a film by a dipping method had a product of the thermal diffusivity and the breaking elongation of $35 \times 10^{-7}$ or more and had good fixability. In particular, Nos. 17, 18, and 19 having a product of $40 \times 10^{-7}$ or more had significantly improved fixability.

INDUSTRIAL APPLICABILITY

As described above, the polyimide tube for a fixing belt of the present invention has good toner fixability and thus can be suitably used in an image-forming apparatus.

REFERENCE SIGNS LIST 1, 21 polyimide tube for fixing belt
2 polyimide layer
3 fluorocarbon resin layer
4 intermediate layer
11 columnar core body
12 nozzle
13 coating layer
101 heater
102 fixing belt
103 pressure roller
A material to be transferred
B unfixed toner
C fixed toner

The invention claimed is:
1. A polyimide tube for a fixing belt of an image-forming apparatus, the polyimide tube comprising:
a polyimide layer that contains a polyimide as a main component and a needle-shaped filler, the needle-shaped filler containing a carbon nanotube and needle-shaped titanium oxide,
wherein a product of a thermal diffusivity (m²/s) of the polyimide layer and a breaking elongation (%) of the polyimide layer in an axial direction is $35 \times 10^{-7}$ or more and $100 \times 10^{-7}$ or less,
wherein a content of the carbon nanotube in the polyimide layer is 10% by volume or more and 13% by volume or less, and a content of the needle-shaped titanium oxide in the polyimide layer is 3% by volume or more and 8% by volume or less, and
wherein an orientation direction of the needle-shaped filler is a circumferential direction.

2. The polyimide tube for the fixing belt according to claim 1, wherein the thermal diffusivity of the polyimide layer is $3.5-10^{-7}$ m²/s or more.

3. The polyimide tube for the fixing belt according to claim 2, wherein the thermal diffusivity of the polyimide layer is $3.5-10^{-7}$ m²/s or more and $6.3 \times 10^{-7}$ m²/s or less.

4. The polyimide tube for the fixing belt according to claim 1, wherein the breaking elongation of the polyimide layer in the axial direction is 7% or more.

5. The polyimide tube for the fixing belt according to claim 4, wherein the breaking elongation of the polyimide layer in the axial direction is 7% or more and 15% or less.

6. The polyimide tube for the fixing belt according to claim 1, wherein the polyimide layer has a modulus of elasticity in the axial direction of 3,000 MPa or less and a modulus of elasticity in a circumferential direction of 5,500 MPa or less at 150° C.

7. The polyimide tube for the fixing belt according to claim 1, wherein the polyimide has a structural unit represented by a formula (1), (2), or (3) below:

[Chem. 1]

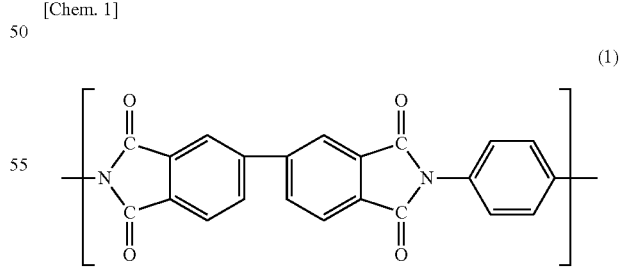

(1)

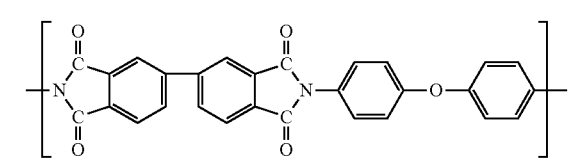

(2)

-continued

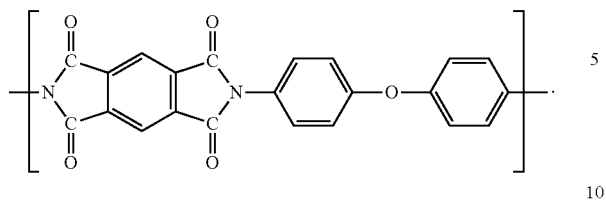

(3)

8. The polyimide tube for the fixing belt according to claim 1, further comprising:
a fluorocarbon resin layer formed on an outer circumferential surface of the polyimide layer.

9. The polyimide tube for the fixing belt according to claim 1, wherein the carbon nanotube has an aspect ratio of 50 or more and 1000 or less, and the needle-shaped titanium oxide has an aspect ratio of 10 or more and 100 or less.

10. The polyimide tube for the fixing belt according to claim 1, wherein the content of the carbon nanotube in the polyimide layer is 10% by volume or more and 12% by volume or less.

* * * * *

UNITED STATES PATENT AND TRADEMARK OFFICE
CERTIFICATE OF CORRECTION

PATENT NO. : 10,423,107 B2
APPLICATION NO. : 15/021016
DATED : September 24, 2019
INVENTOR(S) : Shingo Nakajima et al.

It is certified that error appears in the above-identified patent and that said Letters Patent is hereby corrected as shown below:

In the Claims

At Column 18, Claim number 2, Line number 10, "$3.5— 10^{-7}$" should read --$3.5\times10^{-7}$--.
At Column 18, Claim number 3, Line number 29, "$3.5— 10^{-7}$" should read --$3.5\times10^{-7}$--.

Signed and Sealed this
Tenth Day of December, 2019

Andrei Iancu
*Director of the United States Patent and Trademark Office*